United States Patent [19]
Duff et al.

[11] 3,714,610
[45] Jan. 30, 1973

[54] TORQUE MOTOR

[75] Inventors: Billy E. Duff, Sandy, Utah; Gerald R. Taliaferro, Arlington, Tex.

[73] Assignee: LTV Electrosystems, Inc., Dallas, Tex.

[22] Filed: Aug. 13, 1971

[21] Appl. No.: 171,669

[52] U.S. Cl. ................................. 335/229, 335/274
[51] Int. Cl. ................................................ H01f 7/08
[58] Field of Search ......... 335/229, 230, 274; 310/36

[56] References Cited

UNITED STATES PATENTS 2,905,871  9/1959  Martin .............................. 335/229 X
3,517,359  6/1970  Trbovich et al. ..................... 335/230

Primary Examiner—George Harris
Attorney—James D. Willborn et al.

[57] ABSTRACT

In a torque motor, a flapper is supported by a torsion shaft and extends through an aperture formed in a base. A metal bellows forms a seal around the aperture and between the base and the torsion shaft. An armature is secured to the torsion shaft for actuation by electromagnets to pivot the flapper against the action of the torsion shaft. In one use of the torque motor the flapper includes a blade which is normally centered between opposed nozzles and which is operable upon actuation of the electromagnets to restrict or close either of the nozzles.

12 Claims, 3 Drawing Figures

Patented Jan. 30, 1973
3,714,610
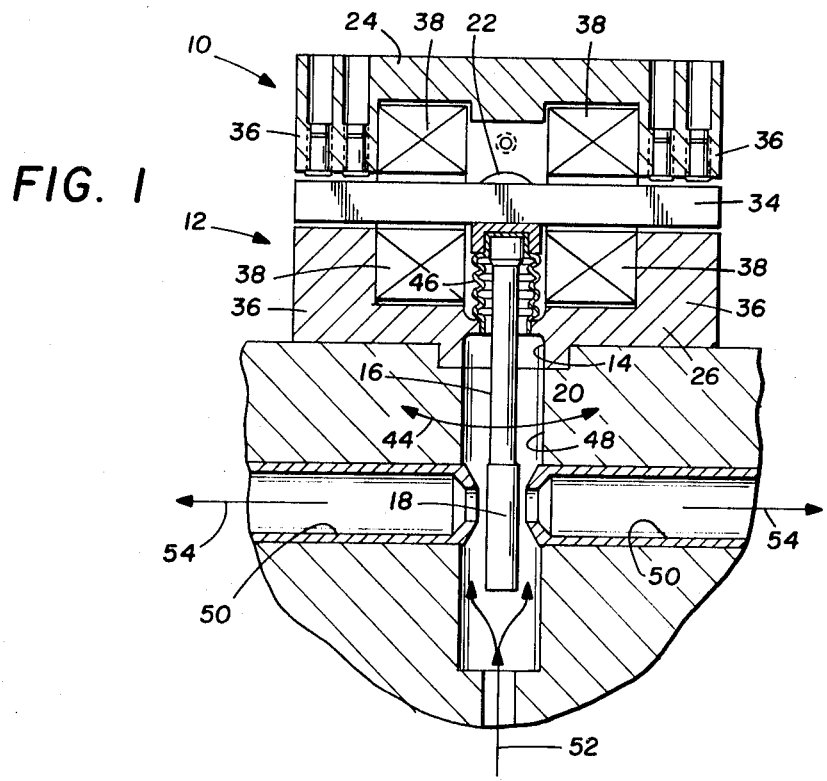
FIG. 1
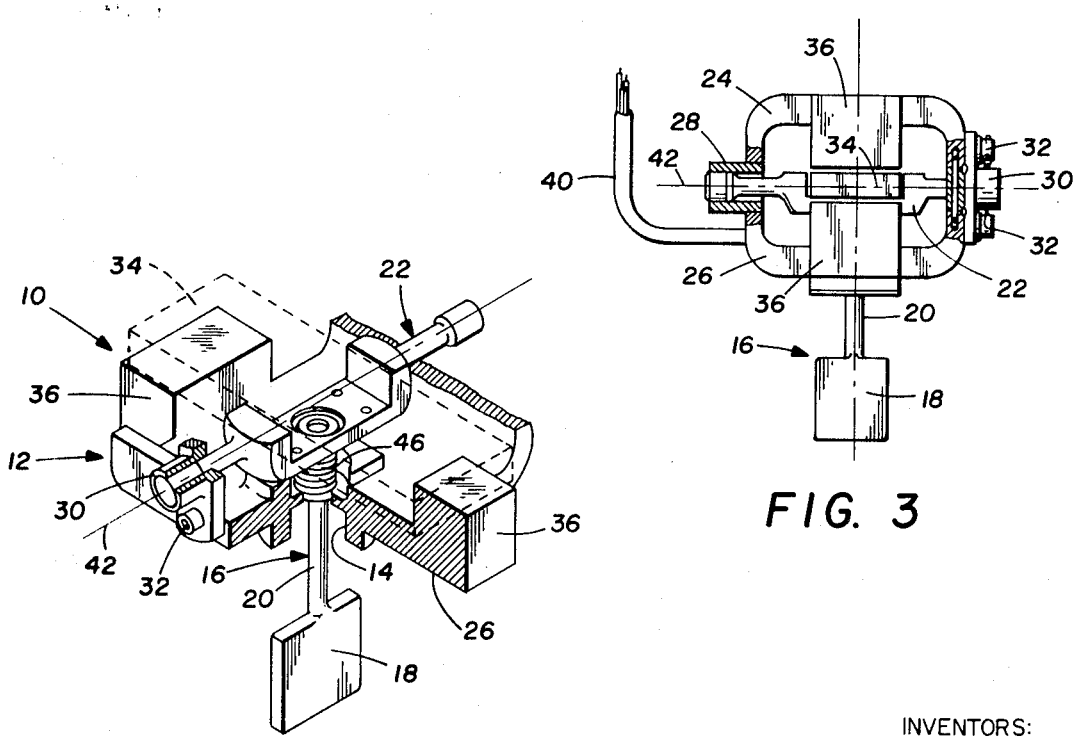
FIG. 2
FIG. 3
INVENTORS:
BILLY E. DUFF
GERALD R. TALIAFERRO
Richards, Harris & Hubbard
ATTORNEYS

TORQUE MOTOR

BACKGROUND AND SUMMARY OF THE INVENTION

This invention relates to a torque motor, and more particularly to a torque motor having improved sealing and flapper supporting and centering structure.

At the present time many torque motors comprise a flapper which extends through an aperture formed in a base and a flexure tube which performs the triple function of supporting the flapper, sealing the aperture in the base, and centering the flapper. In many instances the flexure tube also supports an armature which is positioned for actuation by electromagnets to pivot the flapper about the action of the flexure tube. It has been found that torque motors of this type incorporate a number of inherent disadvantages.

For example, torque motor flexure tubes are typically thin wall, highly stressed members which require extreme care in manufacture in order to avoid machining damage and other defects that might cause failure under operating conditions or in a vibratory environment. In many applications the torque motor must be fluid damped in order to protect the flexure tube, but such damping decreases the performance of the torque motor and may cause sealing or weight problems. Furthermore, optimization of the design of a flexure tube for sealing purposes is incompatible with optimization for flapper centering purposes and vice versa, so most torque motor flexure tubes necessarily incorporate numerous design compromises.

The present invention comprises an improved torque motor which overcomes the foregoing and other unsatisfactory characteristics of the prior art. In accordance with the preferred embodiment of the invention, a torque motor includes a flapper which is supported on and centered by a torsion shaft. The flapper extends through an aperture formed in a base, and the aperture is sealed by a metal bellows. By thus separating the flapper supporting and centering functions from the sealing function, the use of the present invention provides both improved operational performance and elimination of the manufacturing difficulties that have heretofore been involved in making torque motors.

DESCRIPTION OF THE DRAWINGS

A more complete understanding of the invention may be had by referring to the following detailed description when taken in conjunction with the accompanying drawings, wherein:

FIG. 1 is a sectional view of a torque motor comprising the preferred embodiment of the invention;

FIG. 2 is a partial perspective view of the torque motor shown in FIG. 1 in which certain parts have been broken away more clearly to illustrate certain features of the invention; and FIG. 3 is a side view of the torque motor shown in FIG. 1 in which the electromagnets have been omitted for clarity.

DETAILED DESCRIPTION

Referring now to the drawings, and particularly to FIG. 1 thereof, there is shown a torque motor 10 comprising the preferred embodiment of the present invention. The torque motor 10 includes a base 12 having an aperture 14 formed therethrough. A flapper 16 is received in the aperture 14 of the base 12 and comprises a blade 18 and a rod 20 extending therefrom through the aperture 14. The end of the rod 20 remote from the blade 18 is secured to a torsion shaft 22.

As is best shown in FIG. 3, the base 12 of the torque motor 10 comprises opposed portions 24 and 26. The ends of the torsion shaft 22 extend between the opposed portions 24 and 26 of the base 12 and are secured against movement relative to the base 12 by a collar 28 comprising part of the base and a collar 30 which is mounted on the base by a pair of fasteners 32. This construction is highly advantageous in that it permits preloading of the torsion shaft after the torque motor 10 has been assembled. As is best shown in FIG. 2, the flapper 16 is is secured to the torsion shaft 22 at a point midway between the opposite ends thereof.

The torsion shaft 22 also supports an armature 34. The armature 34 is secured to the mid-portion of the torsion shaft 22 and extends therefrom in opposite directions to points located between opposed pole pieces 36 which are formed integrally with the opposed portions 24 and 26 comprising the base 12. As is shown in FIG. 1, the torque motor 10 further includes electromagnets 38 which are mounted within the base 12. The electromagnets 38 are responsive to signals that are directed to the torque motor 10 through a cable 40 to pivot the armature 34 about an axis 42 against the action of the torsion shaft 22. Since the armature 34 and the flapper 16 are both supported on the torsion shaft 22, actuation of the electromagnets 38 results in pivotal movement of the flapper 16 in the direction of the arrow 44.

Referring now specifically to FIGS. 1 and 2, a bellows 46 extends around the aperture 14 formed through the base 12 and between the base 12 and the torsion shaft 22. The bellows 46 is preferably formed from metal and is preferably secured to the base 12 and to the torsion shaft 22 by welding or by brazing. By this means, the bellows 46 forms a highly effective pressure seal for the torque motor 10.

One of the most important features of the present invention is that the bellows 46 functions solely to seal the torque motor 10 and does not function to support or center the flapper 16. This permits optimization of the design of the torsion shaft 22 insofar as supporting and centering of the flapper 16 are concerned and optimization of the bellows 46 insofar as sealing the torque motor 10 is concerned. Also, the bellows 46 may comprise a commercial available component and may be mounted in the torque motor 10 by conventional welding or brazing techniques. Thus, the complicated manufacturing techniques which are required to produce flexure tubes of the type employed in prior art torque motors are completely eliminated.

The torque motor 10 is adapted to a wide variety of uses. One particular use of the torque motor 10 is illustrated in FIG. 1 wherein the torque motor 10 is shown positioned over a chamber 48 and the blade 18 of the flapper 16 is shown positioned between a pair of fluid receiving nozzles 50. The blade 18 is normally centered between the nozzles 50 by the torsion shaft 22 so that fluid entering the chamber 48 in the direction of the arrows 52 flows out of the chamber through both of the nozzles 50 in the directions indicated by the arrows 54.

Upon actuation of the electromagnets 38 of the torque motor 10, the armature 34 is pivoted against the action of the torsion shaft 22. Such pivotal movement of the armature 34 results in pivotal movement of the flapper 16 in the direction of the arrow 44. By this means, the blade 18 of the flapper 16 is selectively positioned to either restrict or block fluid flow through one of the nozzles 50. Other utilizations of the torque motor 10 will immediately suggest themselves to those skilled in the art.

From the foregoing, it will be understood that in accordance with the present invention, a torque motor comprises a flapper which extends through an aperture in a base and which is supported and centered by a torsion shaft, and a metal bellows forming a seal around the aperture in the base and between the base and the torsion shaft. The use of the present invention is highly advantageous over the prior art in that the flapper supporting and centering functions are completely separated from the sealing function. This results in both superior operational performance of torque motors incorporating the invention and in a substantial reduction in the cost of manufacturing torque motors incorporating the invention.

Although the preferred embodiment of the invention has been illustrated in the drawings and described in the foregoing detailed description, it will be understood that the invention is not limited to the embodiment disclosed but is capable of numerous rearrangements, modifications, and substitutions of parts and elements without departing from the spirit of the invention.

What is claimed is:

1. A torque motor comprising:
   a base having an aperture formed therethrough;
   a torsion shaft supported transverse of and in alignment with the aperture and the base in a parallel configuration with respect to the base and including end portions secured against movement relative to the base;
   a flapper extending through the aperture in the base and secured to the torsion shaft perpendicular thereto at a point midway between the end portions thereof;
   a metal bellows extending between the base and the torsion shaft, means forming a seal between the metal bellows and the base, and means forming a seal between the metal bellows and the torsion shaft; and
   means for selectively pivoting the flapper against the action of the torsion shaft.

2. A torque motor comprising:
   a base having an aperture formed therethrough;
   a torsion shaft supported transverse of and in alignment with the aperture in the base in a parallel configuration therewith and including end portions secured against movement relative to the base;
   a flapper extending through the aperture in the base and secured to the torsion shaft perpendicular thereto at a point midway between the end portions thereof;
   a pair of nozzles positioned on opposite sides of the flapper, and wherein the torsion shaft normally centers the flapper between the nozzles;
   a metal bellows extending between the base and the torsion shaft, means forming a seal between the metal bellows and the base, and means forming a seal between the metal bellows and the torsion shaft, and
   an armature secured to the mid-portion of the torsion shaft and electromagnetic means for selectively pivoting the armature against the action of the torsion shaft and thereby pivoting the flapper.

3. The torque motor according to claim 1 wherein the flapper pivoting means comprises an armature secured to the midportion of the torsion shaft and electromagnetic means for selectively pivoting the armature against the action of the torsion shaft and thereby pivoting the flapper.

4. The torque motor according to claim 1 wherein the flapper extends from the torsion shaft through the aperture in the base to a blade, further including a pair of nozzles positioned on opposite sides of the flapper blade, and wherein the torsion shaft normally centers the flapper blade between the nozzles and the flapper pivoting means is operable to control the positioning of the flapper blade relative to the nozzles.

5. A torque motor comprising:
   a flapper;
   a torsion shaft for supporting one end of the flapper perpendicular thereto;
   a base for supporting the torsion shaft in a parallel configuration and including an aperture for receiving the flapper;
   a metal bellows forming a pressure seal around the aperture and the base and between the base and the torsion shaft;
   an armature secured to the torsion shaft for pivotal movement about the axis thereof; and
   electromagnetic means for selectively pivoting the armature and the flapper against the action of the torsion shaft.

6. The torque motor according to claim 5 further including a pair of opposed fluid receiving nozzles, wherein the flapper extends to a blade which is normally centered between the fluid receiving nozzles by the torsion shaft, and wherein the electromagnetic means is operable to control the positioning of the flapper blade relative to the nozzles and thereby selectively restrict or prevent fluid flow into the nozzles.

7. The torque motor according to claim 5 wherein the base further comprises pole pieces positioned adjacent the opposite ends of the armature for limiting the pivotal movement thereof and means supporting the opposite ends of the torsion shaft for preventing movement thereof relative to the base.

8. The torque motor according to claim 7 wherein the means for supporting the ends of the torsion shaft includes means for preloading the torsion shaft.

9. A torque motor comprising:
   a base having an aperture formed through it;
   a torsion shaft supported on the base transverse of and in alignment with the aperture in a parallel configuration with respect to the base;
   a flapper including a blade and a rod extending from the blade through the aperture in the base and connected to the torsion shaft and extending perpendicular thereto;
   a bellows surrounding the aperture and the base and extending therefrom to the torsion shaft;

means forming sealing connections between the bellows and the base and between the bellows and the torsion shaft;
an armature mounted on the torsion shaft; and
electromagnetic means for selective actuation to move the armature and thereby pivot the flapper against the action of the torsion shaft.

10. The torque motor according to claim 9 further including nozzles positioned on opposite sides of the blade of the flapper for closure thereby in response to actuation of the electromagnetic means and wherein the torsion spring normally centers the blade of the flapper between the nozzles.

11. The torque motor according to claim 9 wherein the torsion shaft has an axis extending therethrough, wherein the armature is secured to the torsion shaft for pivotal movement about the axis, and wherein the base further comprises pole pieces positioned on opposite sides of the ends of the armature.

12. The torque motor according to claim 9 wherein the base further comprises means for securing the opposite ends of the torsion shaft against rotation and for permitting preloading of the torsion shaft.

* * * * *